United States Patent [19]
Uziie et al.

[11] Patent Number: 5,689,738
[45] Date of Patent: Nov. 18, 1997

[54] CAMERA HAVING BACK FOCUS ADJUSTING APPARATUS

[75] Inventors: Seiji Uziie; Kazuyoshi Azegami; Hiroshi Nomura, all of Tokyo, Japan

[73] Assignee: Asahi Kogaku Kogyo Kabushiki Kaisha, Tokyo, Japan

[21] Appl. No.: 523,805

[22] Filed: Sep. 5, 1995

Related U.S. Application Data

[63] Continuation of Ser. No. 166,078, Dec. 14, 1993, abandoned.

[30] Foreign Application Priority Data

Dec. 14, 1992 [JP] Japan ................... 4-085644 U
Jan. 14, 1993 [JP] Japan ................... 5-000787 U

[51] Int. Cl.[6] .................................................. G03B 1/18
[52] U.S. Cl. .................................... 396/79; 396/83
[58] Field of Search .................... 354/195.1, 195.12, 354/195.11, 400, 452, 187; 396/72, 79, 83, 90, 91

[56] References Cited

U.S. PATENT DOCUMENTS

| | | |
|---|---|---|
| 4,910,544 | 3/1990 | Nomura ........................ 354/195.12 |
| 4,974,949 | 12/1990 | Tanaka. | |
| 5,036,346 | 7/1991 | Hatamori et al. .............. 354/195.12 |
| 5,083,146 | 1/1992 | Ueda ............................ 354/195.12 |
| 5,144,493 | 9/1992 | Nomura ........................ 354/195.12 |
| 5,144,494 | 9/1992 | Sekiguchi ..................... 354/195.12 |
| 5,270,868 | 12/1993 | Nomura ........................ 354/195.12 |
| 5,293,192 | 3/1994 | Akitake et al. ............... 354/219 |
| 5,307,104 | 4/1994 | Hamasaki ..................... 354/286 |
| 5,376,983 | 12/1994 | Yamazaki et al. ............ 354/195.12 |
| 5,394,210 | 2/1995 | Nomura et al. .............. 354/195.12 |
| 5,430,516 | 7/1995 | Uziie et al. .................. 354/195.1 |
| 5,448,414 | 9/1995 | Hamasaki et al. ........... 354/195.1 |

*Primary Examiner*—Safet Metjahic
*Assistant Examiner*—Nicholas J. Tuccillo
*Attorney, Agent, or Firm*—Greenblum & Bernstein P.L.C.

[57] ABSTRACT

A camera having an apparatus for adjusting a back focus by varying a distance between a rearmost point of lens groups of a photographing optical system and focal plane. The apparatus includes a stationary barrel that supports the lens groups and is fixed to the camera body, and a restricting mechanism that is provided between the camera body and the stationary barrel. The restricting mechanism restricts rotational movement of the stationary barrel with respect to the camera body, while allowing movement of the stationary barrel in an optical axis direction with respect to the camera body.

32 Claims, 11 Drawing Sheets

CAMERA HAVING BACK FOCUS ADJUSTING APPARATUS

This application is a continuation of application Ser. No. 08/166,078, filed Dec. 14, 1993, now abandoned

BACKGROUND OF THE INVENTION

1. Field of the Invention

The present invention is directed to a camera having an apparatus for adjusting a back focus (i.e., a back focal distance) of the camera.

2. Description of Related Art

A zoom lens camera has been provided in which a cam ring is threadedly engaged (through helicoid gears) with a stationary barrel that is fixed to a camera body, with the cam ring being arranged on the interior of the stationary barrel. Zooming is effected such that a plurality of lens groups are moved in an optical axis direction in a predetermined manner in accordance with the rotation of the cam ring. In such a camera, when a back focus adjustment is necessary, a stationary barrel, which is threadedly engaged with the camera body, is rotated with respect to the camera body in an assembly process. Accordingly, all of the lens groups are moved together in the optical axis direction to adjust the rearmost point of the lens groups with respect to the film plane before the stationary barrel is immovably fixed to the camera body.

However, in such a camera, since a back focus is adjusted by rotating the stationary barrel, a photographing lens barrel, including the stationary barrel, is deviated in a circumferential direction from various members formed on the camera body that are associated with the lens barrel when the stationary barrel is rotated. Therefore, the various members should be formed on the camera body taking into consideration the positions of the various members with respect to the photographing lens barrel. This, however, results in a complicated structure.

In the camera having the above-noted structure, it is possible to provide a mechanism for transmitting a driving force of the motor to the cam ring. In such a mechanism, a circumferential gear is provided on an outer peripheral surface of the cam ring, and a final gear of a gear train, provided on the camera body, is engaged with the circumferential gear. In the camera having such a structure, it is necessary that the length of the final gear in the optical axis direction correspond to the adjustable range of the circumferential gear which moves in the optical axis direction in a predetermined range. Since the circumferential gear is moved in the optical axis direction with respect to the camera body, i.e., the final gear, not only when zooming is effected but also when a back focus adjustment is made, the final gear must have a sufficient length for proper engagement with the circumferential gear. In other words, the moving range of the circumferential gear is extended due to the necessity of the back focus adjustment, therefore, the final gear must be made sufficiently long. Accordingly, since the final gear must be made long, this is an obstacle in the realization of a compact camera.

SUMMARY OF THE INVENTION

The primary object of the present invention is to provide a camera having a back focus adjusting apparatus which makes it possible to simplify the structure around the lens barrel.

Another object of the present invention is to provide a camera having a back focus adjustment apparatus in which it is possible to downsize the final gear, thereby contributing to the reduction in size of the camera as a whole.

To achieve the object mentioned above, according to the present invention, a camera having an apparatus for adjusting a back focus, by varying a distance between a rearmost point of lens groups of a photographing optical system and a focal plane, is provided, including a stationary barrel that supports the lens groups and is fixed to a camera body, and a restricting mechanism that is provided between the camera body and the stationary barrel. The restricting mechanism restricts rotational movement of the stationary barrel with respect to the camera body while allowing movement of the stationary barrel in an optical axis direction with respect to the camera body.

With this arrangement, since the position of the stationary barrel is changed in the optical axis direction without rotating, when a back focus adjustment is made, a photographing lens barrel, including the stationary barrel, is not deviated from various members formed on the camera body in a circumferential direction. Therefore, it is not necessary to consider the circumferential positions of the various members with respect to the zoom lens barrel upon making the back focus adjustment.

According to another aspect of the present invention, a camera having an apparatus for adjusting a back focus is provided, including a stationary barrel that is fixed to an associated camera body, a cam ring that is threadedly engaged with the stationary barrel on an inner peripheral surface of the stationary barrel, and a gear train for rotating the cam ring by transmitting a driving force to a circumferential gear that is provided on an outer peripheral surface of the cam ring. A back focus adjustment is effected by moving the stationary barrel in an optical axis direction. The apparatus also includes, a final gear and a transmitting gear. The final gear and the transmitting gear are components of the gear train. The final gear is engaged with the circumferential gear and the transmitting gear is engaged with the final gear. Both the final gear and the transmitting gear are supported on the stationary barrel so that both gears move together with the stationary barrel in the optical axis direction upon back focus adjustment. The back focus adjustment is effected in accordance with movement of the stationary barrel in the optical axis direction. A shaft is provided about which the transmitting gear rotates, the shaft is provided in a manner such that the transmitting gear is movable in the optical axis direction with respect to the shaft. The shaft is supported on the camera body. The circumferential gear is provided parallel to a thread formed onto said cam ring. The final gear has sufficient axial length so as to maintain engagement between the final gear and the circumferential gear over an entire range of axial movement of the cam ring.

With this arrangement, since the final gear is only required to have a length which corresponds to the adjustable range of the circumferential gear, i.e., the moving range of the cam ring in the optical axis direction, regardless of the moving amount of the cam ring due to an adjustment of a back focus, it is possible to keep the length of the final gear short. As a result, it is possible to downsize the camera.

The present disclosure relates to subject matter contained in Japanese Utility Model Applications No. HEI 4-85644 (filed on Dec. 14, 1992) and No. HEI 5-787 (filed on Jan. 14, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
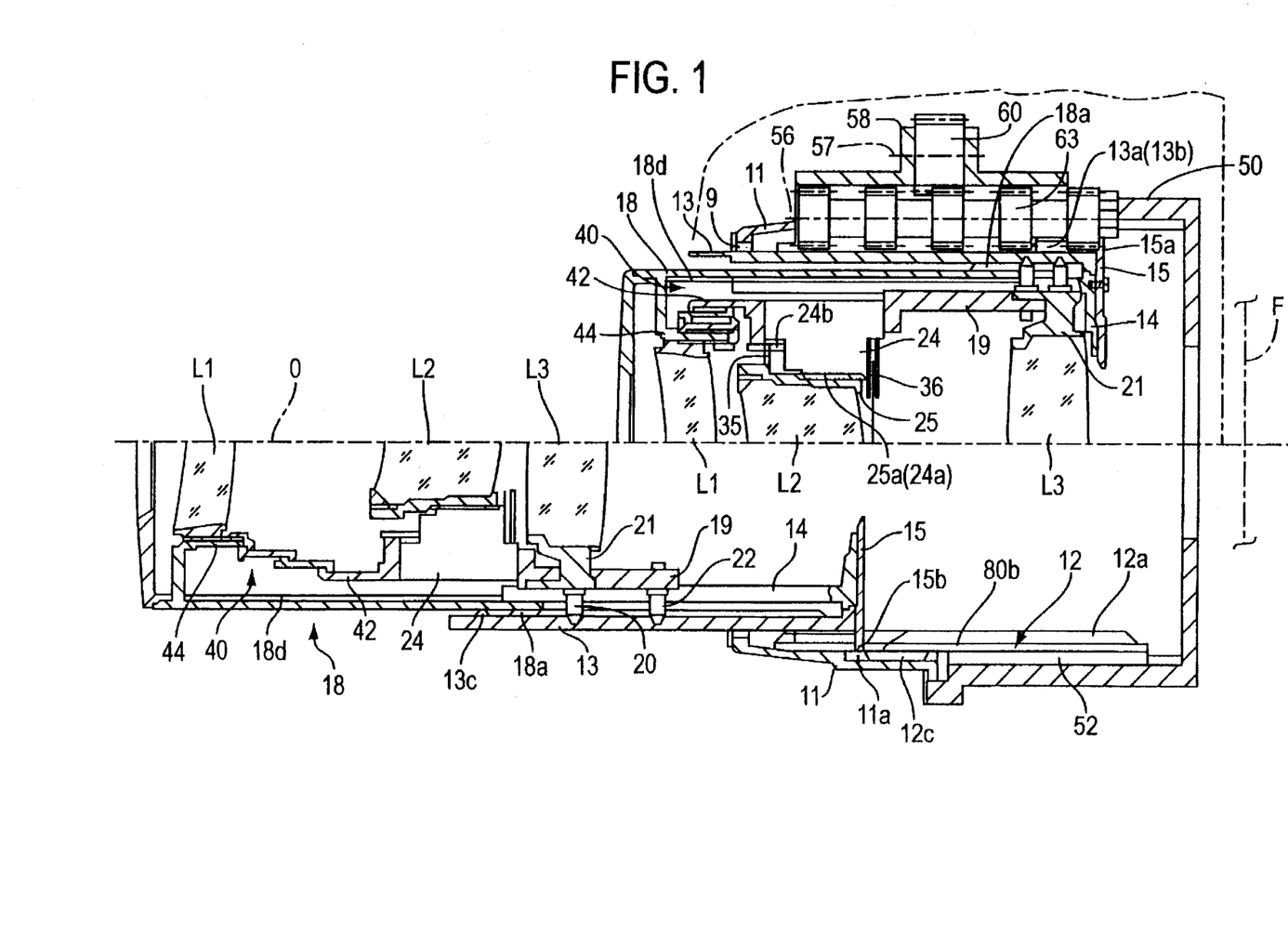
FIG. 1 is a longitudinal sectional view of a zoom lens barrel of a lens shutter type camera to which the present invention is applied, showing an upper half of the zoom lens barrel in a retracted state, and a lower half of the zoom lens barrel in a fully projected state.
Figure 2:
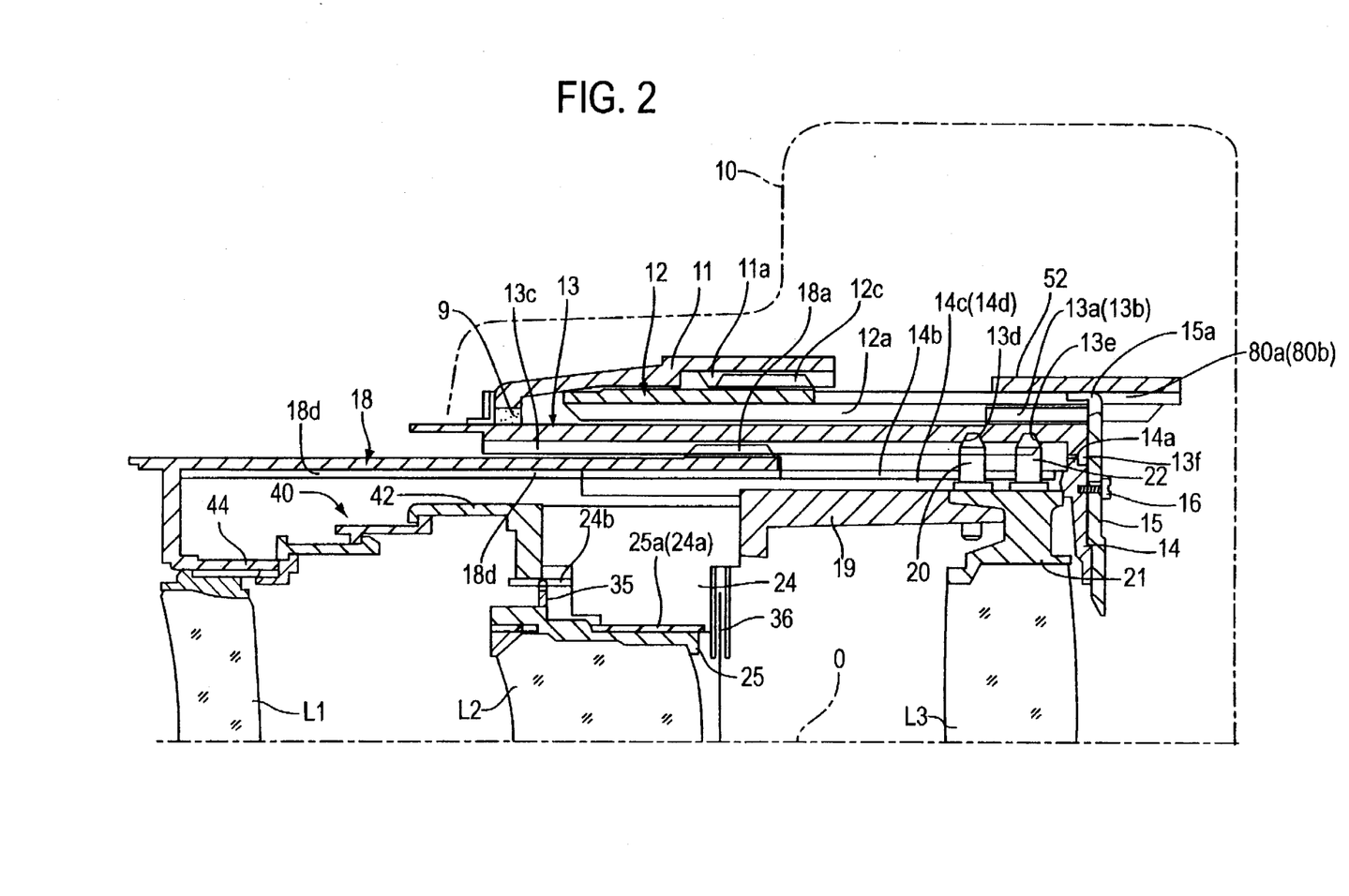
FIG. 2 is a longitudinal sectional view of an upper half of the zoom lens barrel of FIG. 1, showing a different cross-section thereof.
Figure 3:
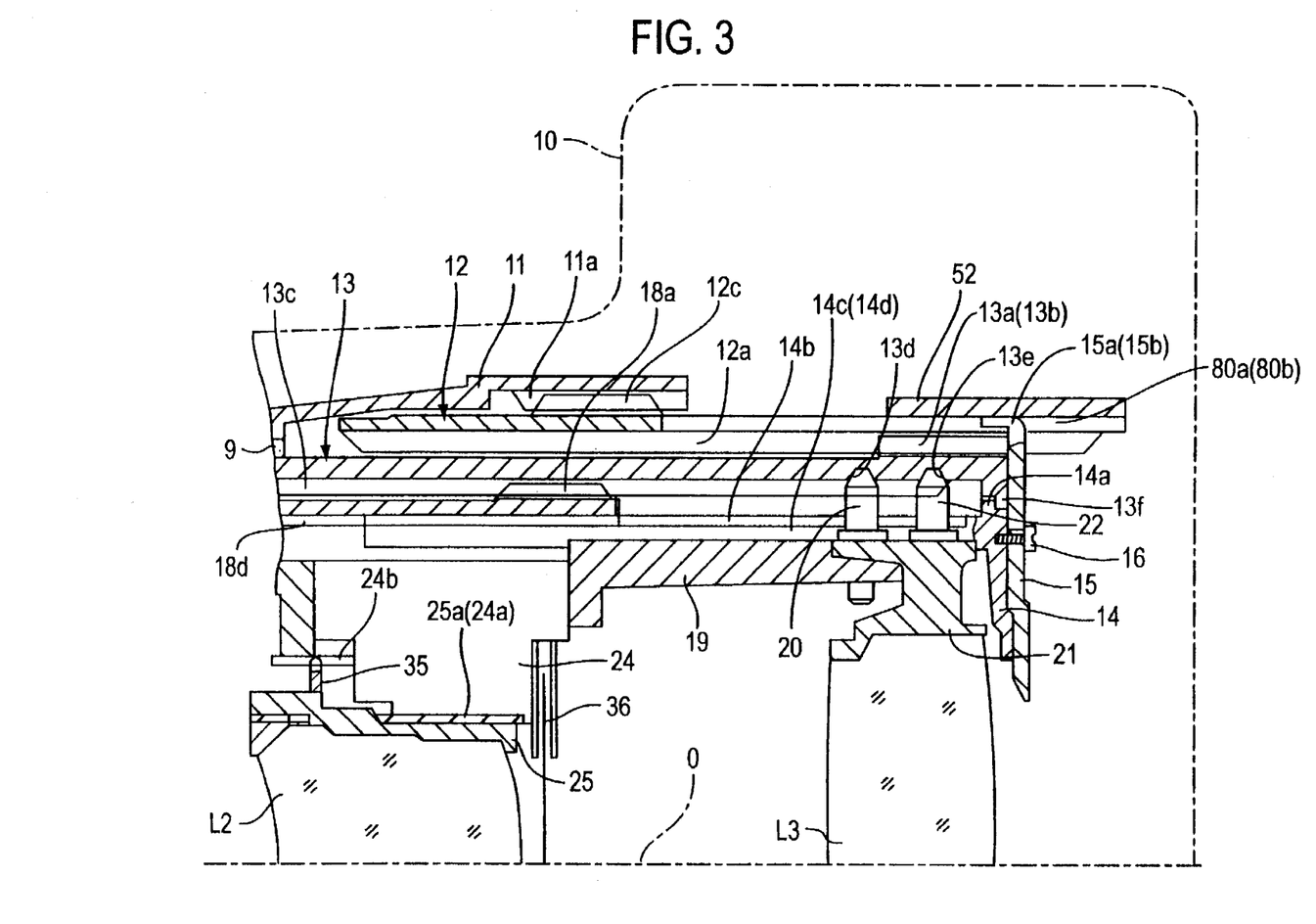
FIG. 3 is an enlarged longitudinal sectional view of an upper half of the zoom lens barrel of FIG. 2, showing a portion of the zoom lens barrel.

As shown in FIGS. 1 to 3, a zoom lens barrel of a camera to which the present invention is applied includes three lens groups, i.e., a first lens group L1, a second lens group L2, and a third lens group L3. The three lens groups are moved in an optical axis direction O in a predetermined manner to effect a zooming operation. The second lens group L2 is moved to effect focusing.

A stationary block 50 is fixed to a camera body 10. The stationary block 50 is provided with an opening 51 to accommodate a stationary barrel 12. The stationary barrel 12 is axially movable during a back focus adjustment operation. Thus it might be characterized as a rotationally stationary barrel. The stationary barrel 12 is provided on its outer peripheral surface with a plurality of linear keys 52. The stationary block 50 is integrally provided with an inner wall 51b in the opening 51. The inner wall 51b is provided thereon with a plurality of linear grooves 51 with which the corresponding linear keys 52 are slidably engaged. Accordingly, the stationary barrel 12 is engaged with the stationary block 50 by engaging the plurality of linear keys 52 with the corresponding linear grooves 51a. The stationary barrel 12 is thereby movable in the optical axis direction O. Rotational movement of the stationary barrel 12 is restricted with respect to the stationary block 50. The stationary barrel 12 is provided on its outer peripheral surface with a male helicoid gear 12c. The stationary barrel 12 is provided with an accommodating portion 55 which projects radially outward from the outer peripheral surface of the stationary barrel 12. The accommodating portion 55 supports a first pinion 63. The first pinion 63 is rotatable and oriented parallel to the optical axis direction O. The first pinion 63 is a final gear of a gear train G shown in FIG. 6.

An adjusting ring 11, which is provided on its inner peripheral surface with a female helicoid gear 11a, is threadedly engaged with the stationary barrel 12, i.e., the female helicoid gear 11a is engaged with the male helicoid gear 12c. The adjusting ring 11 is supported in a manner such that it is rotatable around the optical axis O, but immovable with respect to the stationary block 50 in the optical axis direction O. With this arrangement, upon assembly, the stationary barrel 12 is moved forwardly and rearwardly in the optical axis direction O with respect to the stationary block 50, when the adjusting ring 11 is rotated in the forward and reverse rotational directions, respectively. The movement of the adjusting ring 11 is restricted in the optical axis direction O with respect to the stationary block 50, i.e., the camera body 10, when a back focus adjustment is carried out. Therefore, the stationary barrel is varied in the optical axis direction O, with respect to the camera body 10, i.e., a film F (shown in FIG. 1), when the stationary barrel 12 moves with respect to the adjusting ring 11. The adjusting ring 11 is provided on its inner peripheral front edge with an annular light intercepting member 9, which comes into contact with the outer peripheral surface of a cam ring 13.

The stationary barrel 12 is provided on its inner peripheral surface with a female helicoid gear 12a. The cam ring 13 is provided on its outer peripheral surface with a male helicoid gear 13a. The cam ring 13 is threadedly engaged with the stationary barrel 12 on the inside of the stationary barrel 12 with the male helicoid gear 13a engaging with the female helicoid gear 12a. The cam ring 13 is further provided with a circumferential gear 13b which is inclined in a lead direction of the male helicoid gear 13a. The circumferential gear 13b is engaged with a first pinion (i.e., a final gear of a gear train G) 63 which rotates at a predetermined position.

Figure 7:
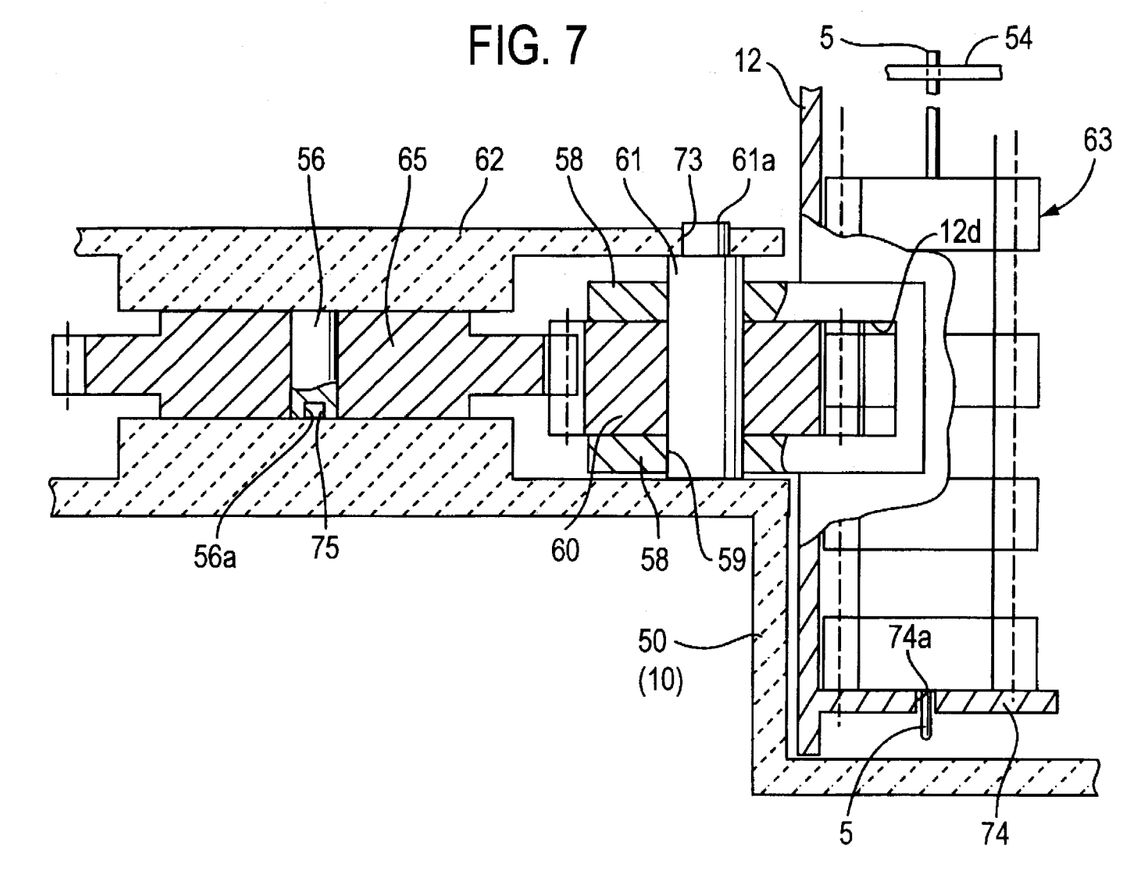
FIG. 7 is a longitudinal sectional view of the camera and lens, illustrating the connecting structure of a transmitting gear and a final gear of a gear train that transmit a driving force to a cam ring of the camera.
Figure 11:
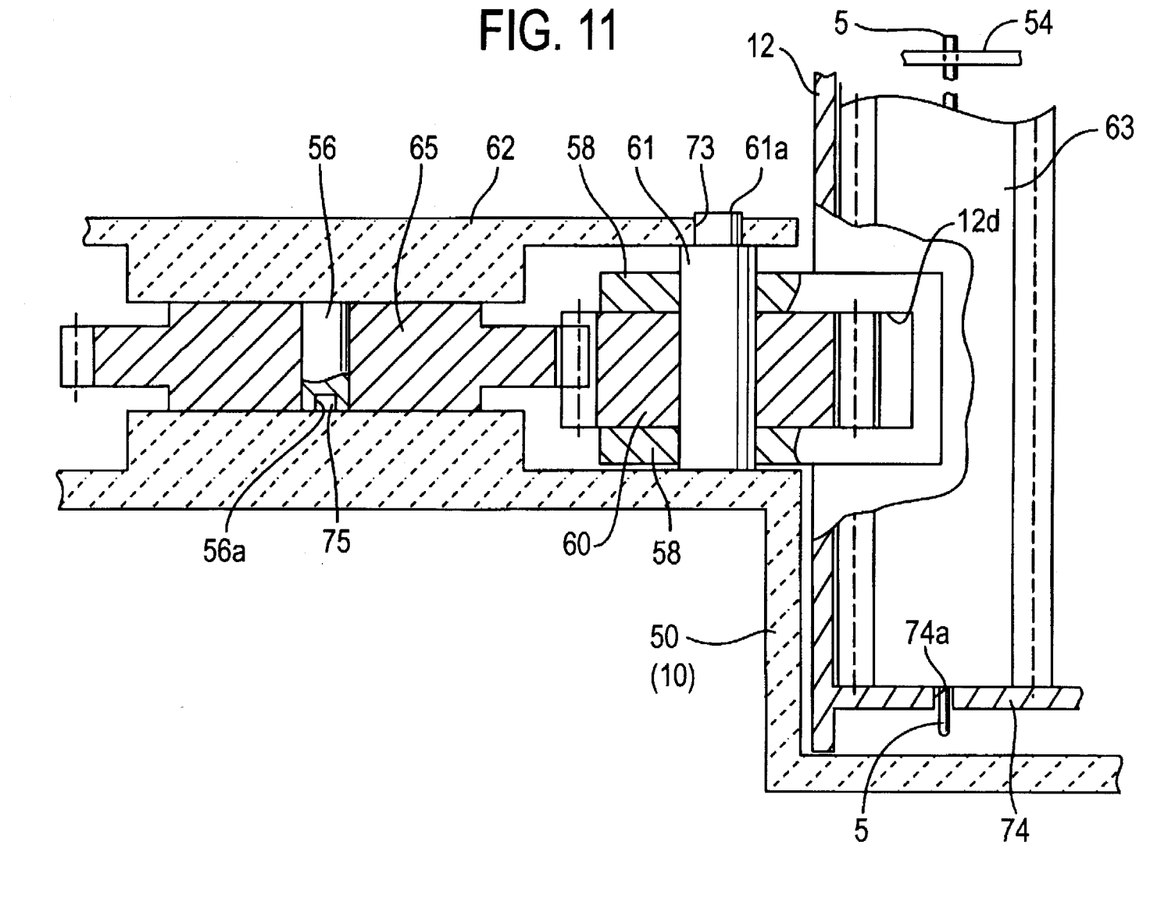
FIG. 11 is a longitudinal sectional view of the camera and lens, illustrating a different structural example of the final gear shown in FIG. 7.

The first pinion 63 is made of a plurality of pinions which are aligned at regular intervals and have a total length which corresponds to the adjustable range of the circumferential gear 13b in the optical axis direction O, as shown in FIG. 7. The first pinion 63 has a shaft 5 on which the first pinion 63 is fixed. One end of the shaft 5 is rotatably supported by the accommodating portion 55 through a supporting plate 54 fixed to the accommodating portion 55. The other end of the shaft 5 is rotatably fitted in a hole 74a formed on a supporting portion 74. The supporting portion 74 is integrally formed on the inner peripheral rear end of the stationary barrel 12. Accordingly, the first pinion 63 is provided on the stationary barrel 12 in a manner such that it can engage with the circumferential gear 13b, while the movement thereof is restricted in both the radial and optical axis directions with respect to the stationary barrel 12. The first pinion 63 may also be made of a single pinion having a length corresponding to the adjustable range of the circumferential gear 13b in the optical axis direction O, as shown in FIG. 11, rather than a plurality of pinions which are aligned at regular intervals, as shown in FIG. 7.

The cam ring 13 is further provided on its inner peripheral surface with a female helicoid gear 13c and inner cam grooves 13d and 13e for moving the first, second, and third lens groups L1, L2 and L3, respectively. Each of the inner cam grooves 13d and 13e are provided with a plurality of grooves having different circumferential positions with respect to each other. The plurality of grooves are formed by cutting away predetermined portions of the female helicoid gear 13c.

A linear guiding ring 14 is provided in the cam ring 13. The outer peripheral surface of the linear guiding ring 14 contacts the inner peripheral surface of the cam ring 13. An outer circumferential flange 14a, which is in contact with an inner circumferential flange 13f provided on the cam ring 13, is formed at the rear end of the linear guiding ring 14. A linear guiding plate 15 is fixed to the rear end of the linear guiding ring 14 by screws 16. The linear guide plate 15 is provided in a manner such that the inner circumferential flange 13f is held between the linear guide plate 15 and the outer circumferential flange 14a and is rotatable therebetween. Accordingly, the linear guiding ring 14 is rotatable with respect to the cam ring 13 and is movable together with the cam ring 13 in the optical axis direction O.

Figure 8:
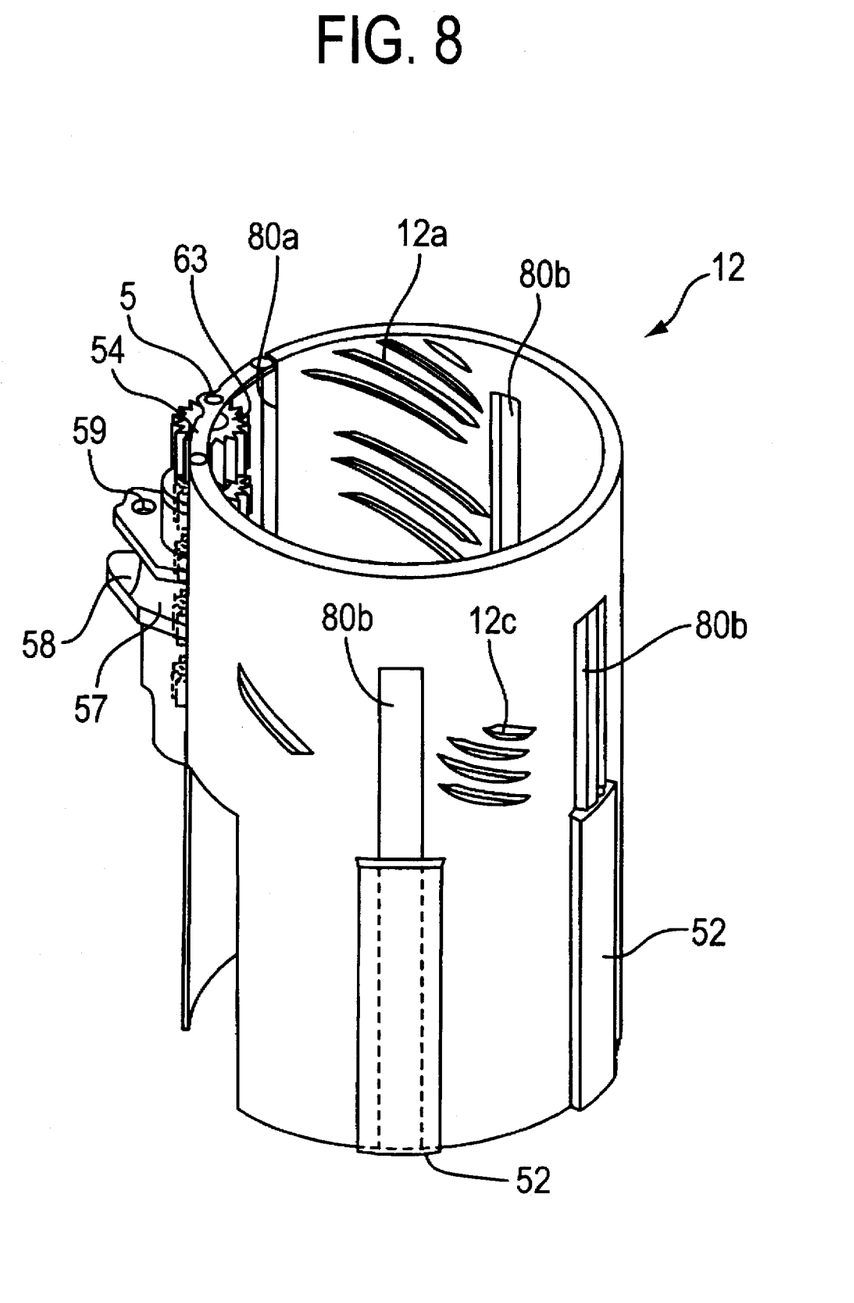
FIG. 8 is a isometric view of a stationary barrel of the zoom lens barrel.

As shown in FIG. 8, a linear guiding groove 80a is provided on the inner peripheral surface of the stationary barrel 12. Three linear guiding grooves 80b are also provided on the inner peripheral surface of the stationary barrel 12. The linear guiding groove 80a is provided at a position corresponding to the position of the accommodating portion 55. The first pinion 63 is positioned in the linear guiding groove 80a with an axis of the first pinion 63 orientated parallel to the optical axis O. The three linear guiding grooves 80b are each formed to have a lesser width than that of the linear guiding groove 80a in a circumferential direction of the stationary barrel 12. Each of the three linear guiding grooves 80b extends continuously from the lower end of the stationary barrel 12 to a predetermined point on the upper portion of the stationary barrel 12, as viewed in FIG. 8. The predetermined upper portions of the grooves 80b are formed as elongated holes in the stationary barrel 12 and the remaining portions (lower sections) of the grooves 80b are formed as blind-end grooves in the stationary barrel 12. Bottom portions of the linear keys 52 (i.e., the sides of the linear keys 52 opposite the sides which engage with the linear grooves 51a) correspond to the bottom surfaces of the blind-end grooves.

Figure 9:
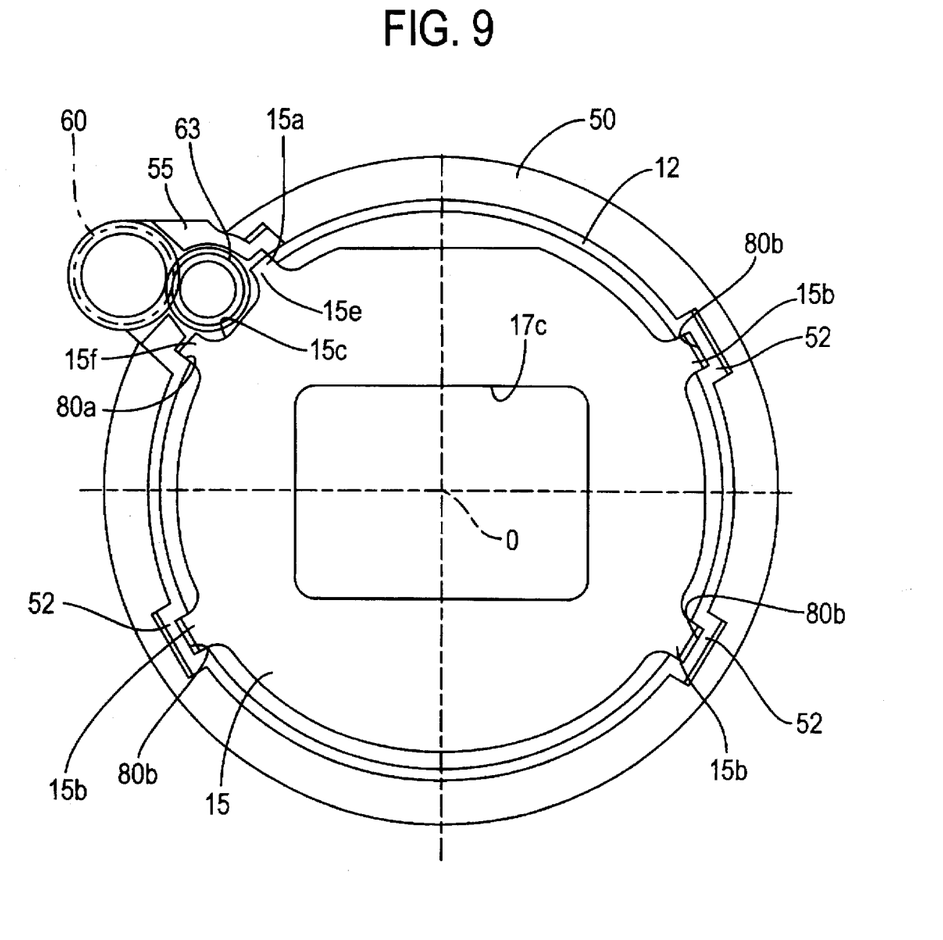
FIG. 9 is an outline view of the stationary barrel and a linear guiding plate, as viewed from the camera body side, illustrating the structure of the stationary barrel and the linear guiding plate.
Figure 10:
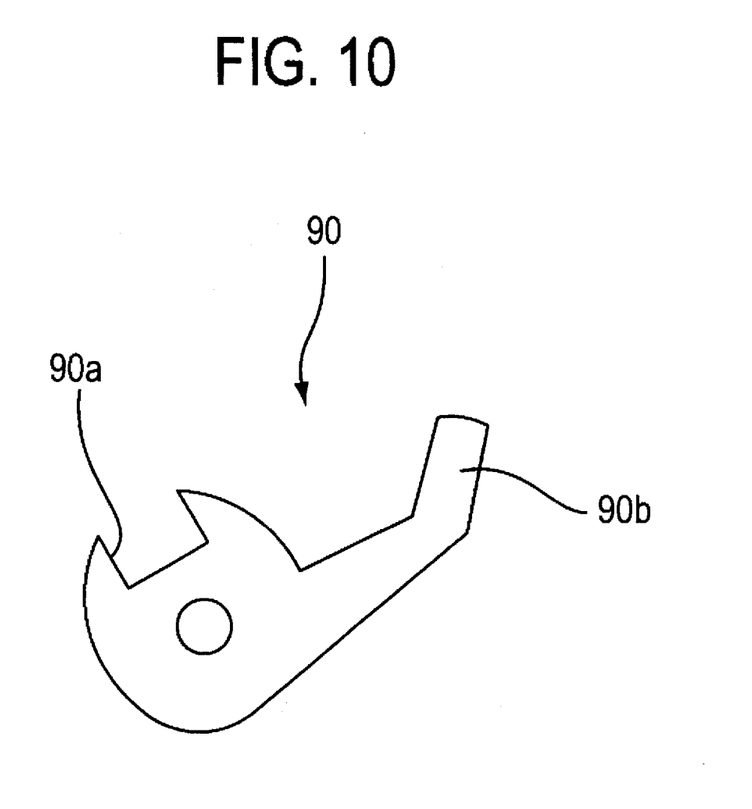
FIG. 10 is an enlarged view of a holding member.

A radial projection 15a and three radial projections 15b are provided on the linear guiding plate 15 as shown in FIG. 9. The linear guiding plate 15 is positioned in the interior of the stationary barrel 12 with the radial projections 15a and 15b engaging with the corresponding linear guiding grooves 80a and 80b, respectively. The shape of radial projection 15a corresponds to the linear guiding groove 80a so as to engage therewith. The radial projection 15a has a recessed portion 15c which recedes from the first pinion 63. The recessed portion 15c is made only deep enough to prevent the first pinion 63 from contacting the bottom surface of the recession. The shape of the three radial projections 80b corresponds to the three linear guiding grooves 80b, so as to engage therewith.

As shown in FIGS. 1 through 3, the female helicoid gear 13c is engaged with a male helicoid gear 18a which is formed on the outer peripheral surface of a first lens group supporting frame (i.e., lens barrel) 18. The first lens group L1 is supported by the first lens group supporting frame 18. The leads of the female helicoid gear 13c and of the male helicoid gear 18a are opposite those of the female helicoid gear 12a and male helicoid gear 13a. A cam pin 20, formed on the outer peripheral surface of a second lens group moving frame 19, is engaged with the inner cam groove 13d. A cam pin 22 is formed on the outer peripheral surface of a third lens group supporting frame 21. The cam pin is engaged with the inner cam groove 13e. The cam pins 20 and 22 are engaged with linear guiding grooves 14c and 14d, respectively. Both of the linear guiding grooves 14c and 14d are formed parallel to the optical axis O and have different circumferential positions.

The second lens group moving frame 19 is fixed to the rear end of an AF/AE shutter unit 24. An annular moving member 42 is fixed to the front end of the AF/AE unit 24. The AF/AE unit is provided on its inner peripheral surface with a female helicoid gear 24a. The female helicoid gear 24a is engaged with a male helicoid gear 25a formed on the outer peripheral surface of a second lens group supporting frame 25 to which a second lens group L2 is fixed. The AF/AE unit is provided with a driving pin 24b which is moved in a circumferential direction through predetermined angles in accordance with object distance information inputted from an object distance measuring apparatus (not shown). The driving pin 24b is engaged with an interlocking arm 35 radially projecting from the second lens group supporting frame 25. Accordingly, the second lens group supporting frame 25, i.e., the second lens group L2 is moved forwardly and rearwardly in the optical axis direction O for focusing, in accordance with a rotational angle of the driving pin 24b and the leads of the helicoid gears 24a and 25a. The AF/AE shutter unit 24 also opens and closes shutter blades 36 in accordance with object brightness information inputted from an object brightness measuring apparatus (not shown).

A linear key 18d is formed on the inner peripheral surface of the first lens group supporting frame 18. The linear key 18d is engaged with the linear guiding groove 14b. Accordingly, the first lens group supporting frame 18, i.e., the first lens group L1 is linearly guided by the linear guiding groove 14b. A light intercepting portion 40 is provided between an annular member 44, integrally formed on the first lens group supporting frame 18, and the annular moving member 42.

A supporting portion 57 is provided on the outer peripheral surface of the stationary barrel 12 at the rear of the supporting portion 55, in the optical axis direction O. The supporting portion 57 includes a pair of brackets 58, which are formed parallel to each other, in the optical axis direction O. The brackets 58 hold a second pinion (i.e., transmitting gear) 60 therebetween. The second pinion 60 is a component of the gear train G that transmits a driving force of a motor 72 to the first pinion 63. The second pinion 60 rotates about a shaft 61 which is integral with the stationary block 50. The pair of brackets 58 have a pair of supporting holes 59 in which the shaft 61 is slidably fitted. Accordingly, the second pinion 60 is held between the pair of brackets 58. The second pinion 60 is engaged with the first pinion 63 through a hole 12d which is formed in the stationary barrel 12 between the pair of brackets 58, as shown in FIG. 7. Accordingly, the second pinion 60 is provided on the stationary barrel 12 such that the movement of the second pinion 60 is restricted in the optical axis direction O by the pair of brackets 58.

The adjusting ring 11 is supported by the stationary barrel 12 with the male helicoid gear 12c engaging with the female helicoid gear 11a. Three sector flanges 11b, which project outwardly in a radial direction of the adjusting ring 11, are provided on the outer peripheral rear end of the adjusting ring 11 at three different circumferential positions. The adjusting ring 11 moves forwardly and rearwardly with respect to the stationary barrel 12 in the optical axis direction O when the adjusting ring 11 is rotated in forward and reverse directions, respectively. The movement of the three sector flanges 11b are restricted in the optical axis direction O by a restricting means, which will be described hereinafter. The restriction of movement of the three sector flanges 11b results in the restriction of movement of the adjusting ring 11 in the optical axis direction O. Accordingly, rotation of the adjusting ring 11 results in the movement of the cam ring 13, in the optical axis direction O, together with the stationary barrel 12 to vary the position of the first, second, and third lens groups L1, L2, and L3 with respect to the camera body 10, i.e., a film plane (not shown). As a result, a back focus adjustment can be made.

Three holes 93 are formed in the stationary block 50 around the opening 51 at positions corresponding to the three sector flanges 11b, respectively. A projection 92 is provided on the stationary block 50 in the vicinity of each of the holes 93. A holding member 90 is provided on the stationary barrel 50 at the position of each of the holes 93. The holding members 90 are hook shaped and are fixed at their center portions on the stationary block 50 by screws 91 threadedly engaged in the corresponding holes 93. Each of the holding members 90 has an arm portion 90b which is movable across the corresponding sector flange 11b. Each of the holding members also has a recessed portion 90a which is engaged with the corresponding projection 92. With the above described structure, movement of the adjusting ring 11, with respect to the camera body 10 is restricted in the optical axis direction O. The restricting means is composed of the three sector flanges 11b, holes 93, projections 92, screws 91, and holding members 90.

Figure 4:
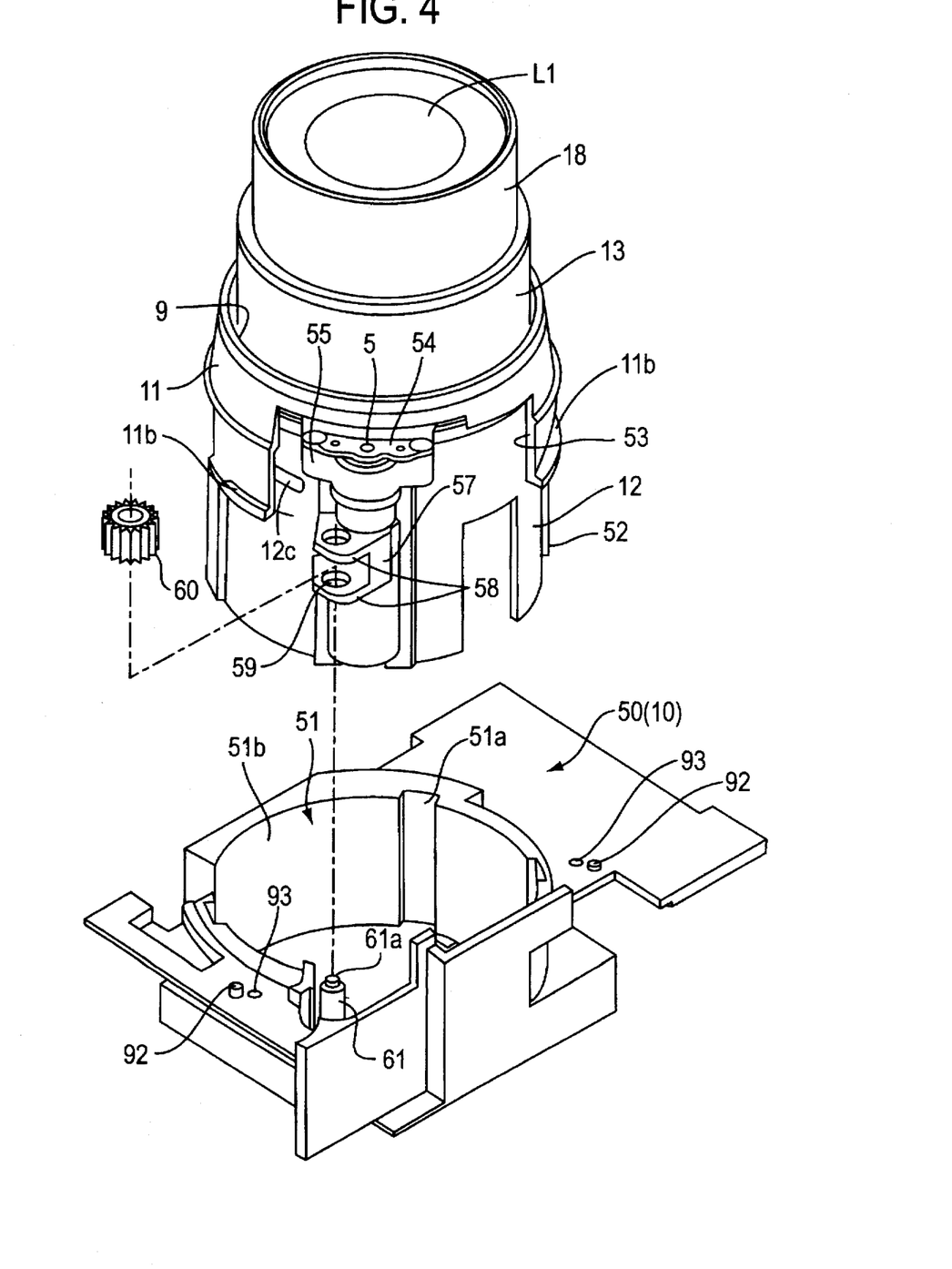
FIG. 4 is an exploded isometric view of a stationary block and the zoom lens barrel, illustrating the connecting structure of the stationary block and the zoom lens barrel.

The adjusting ring 11 is provided on its outer peripheral rear end, at a predetermined circumferential position, with a sector gear 78. A positioning plate 76 is fixed on the stationary block 50 adjacent to the sector gear 78 by a screw 77b. The positioning plate 76 is formed thereon with an engaging gear 76a which is engaged with the sector gear 78. The positioning plate 76 is movable in the right and left directions of FIG. 4, with respect to the stationary block 50, when the screw 77b is loosened. The positioning plate 76 is fixed to the stationary block 50 by fastening the screw 77b. Accordingly, when the positioning plate 76 is tightly fixed to the stationary block 50, rotational movement of the adjusting ring 11 is restricted by the engaging gear 76a engaged with the sector gear 78. A screw 77a is loosely fastened to the stationary block 50 through the positioning plate 76. The screw 77a is always loose. It is only used for guiding the positioning plate 76 in a horizontal direction of FIG. 6.

The shaft 61 is parallel to the optical axis O and extends in a direction passing through the centers of supporting holes 59. The shaft 61 allows the second pinion 60 to move in the optical axis direction with respect to the stationary block 50. Since the first and second pinions 60 and 63 are engaged with each other in the above construction, it is sufficient that the length of the first pinion 63 only correspond to the moving range of the circumferential gear 13b in the optical axis direction. In other words, it is not necessary that the length of the first pinion 63 be extended to compensate for the slight movement of the circumferential gear in the optical axis direction O, due to a back focus adjustment, in order to maintain the proper engagement between the circumferential gear 13b and the first pinion 63.

Figure 5:
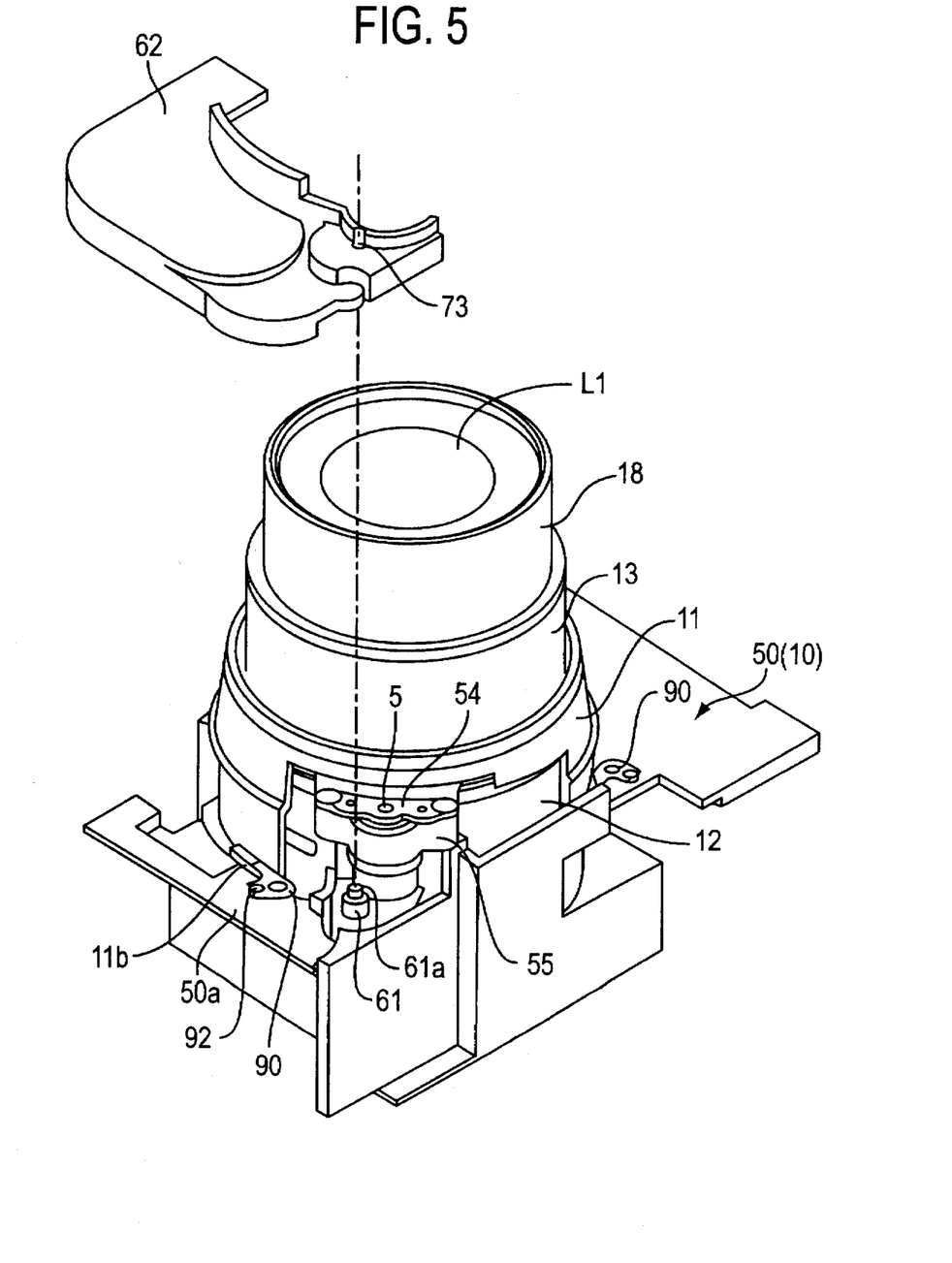
FIG. 5 is an isometric view of the stationary block and the zoom lens barrel in an assembled state.

Gears 65, 66, 67, 68, 69, and 70, which are components of the gear train G, and the motor 72 are supported on a supporting member 62 (shown in FIG. 5) which is fixed to the stationary block 50 in position. When the supporting member 62 is fixed to the stationary block 50, the gear 65, which is engaged with the second pinion 60, is rotatably supported by a rotational shaft 56 which projects from the supporting member 62 on the inner surface thereof. The rotational shaft 56 is provided with a hole 56b at an end portion thereof in which a projection 75, provided on the stationary block 50 at a predetermined position, is engaged. In this state, the supporting member 62 is fixed to the stationary block 50 by screws (not shown).

As shown in FIG. 7, a positioning hole 73 is formed in the supporting member 62 at a position corresponding to that of a reduced diameter shaft portion 61a formed at the end of the shaft 61. The reduced diameter portion 61a is engaged in the positioning hole 73. The supporting member 62, with the components of the gear train G and the motor 72 supported thereon, is fixed to the stationary block 50 by engaging the positioning hole 73 with the reduced diameter portion 61a and precisely positioning the gear 65 in engagement with the second pinion 60. Accordingly, the first and second pinions 63 and 60 are provided on the stationary barrel 12 in a manner such that their movement is restricted in both the optical axis and radial directions with respect to the stationary barrel 12. Furthermore, the gears of gear train G are provided on the stationary barrel 12 through the supporting portion 62 in a manner such that their movement is restricted in the optical axis direction O with respect to the stationary barrel 12. The motor 72 is secured to the lower surface of the supporting portion 62 by screws in a manner such that a pinion 71, which is fixed on a drive shaft (not shown) of the motor 72, is engaged with the gear 70.

The operation of the zoom lens barrel having the above-noted structure, to which the present invention is applied, is described below. When the first pinion 63, which is engaged with the circumferential gear 13b, is driven by the motor 72 through the gear train G in the maximum retracted state of the zoom lens barrel, the cam ring 13 rotates and projects forwardly in the optical axis direction O, in accordance with the male helicoid gear 13a and the female helicoid gear 12a.

The first lens group supporting frame 18, which is linearly guided by the linear guiding ring 14, is then further projected forwardly with respect to the cam ring 13 in accordance with the male helicoid gear 18a and the female helicoid gear 13c, whose lead directions are opposite each other. Likewise, the second lens group moving frame 19 and the third lens group supporting frame 21, which are linearly guided by the linear guiding ring 14, are projected forwardly in the optical axis direction O to effect a zooming operation in accordance with the rotation of the cam ring 13, which drives cam pins 20 and 22 through inner cam grooves 13d and 13e of the cam ring 13.

When the motor 72 is actuated, the gear 65 of the gear train G transmits the driving force of the motor 72 to the second pinion 60, while maintaining an appropriate engagement between the gear 65 and the second pinion 60, due to the reduced diameter portion 61a of the shaft 61 being engaged in the positioning hole 73 of the supporting member 62. The relationship of the gears of the gear train G and the pinion 71 of the motor 72 does not change with respect to the second pinion 63, because the gears of the gear train G, and the pinion 71 are supported by the supporting member 62 whose positioning hole 73 is engaged with the reduced diameter portion 61a.

The driving force of the motor 72, transmitted to the cam ring 13, remains stable due to the position of the first pinion 63 relative to the stationary barrel 12 being maintained constant through the supporting plate 54 and the supporting portion 74. Stability is further maintained by the engagement of the first pinion 63 and the circumferential gear 13b being appropriately maintained through the supporting plate 54 and the supporting portion 74. Stability is yet further maintained by the engagement of the second pinion 60 with the first pinion 63 being appropriately maintained by the bracket 58 and the shaft 61. In the case that the first pinion 63 is supported on, e.g., the camera body 10, the distance between the axes of the first pinion 63 and the circumferential gear 13b might not be appropriate since the diameter of manufactured stationary barrels is not always exact, due to limitations on the precision of the manufacturing process.

This results in an inaccurate positioning of the stationary barrel 12 with respect to the camera body 10. According to the above embodiment of the present invention, however, since the distance between the axes of the first pinion 63 and the circumferential gear 13b is fixed due to the first pinion 63 being supported on the stationary barrel 12, an improper state of engagement is avoided. Accordingly, damage to gears caused by the variation of distance between the axes of the gears can be prevented.

As discussed above, since the length of the first pinion 63 does not need to be extended to compensate for the slight movement of the circumferential gear in the optical axis direction O, due to a back focus adjustment, in order to maintain the proper engagement between the circumferential gear 13b and the first pinion 63, the length of the first pinion 63 in the optical axis direction O can remain short. Accordingly, the small size of the first pinion 63 contributes to downsizing of the camera.

Figure 6:
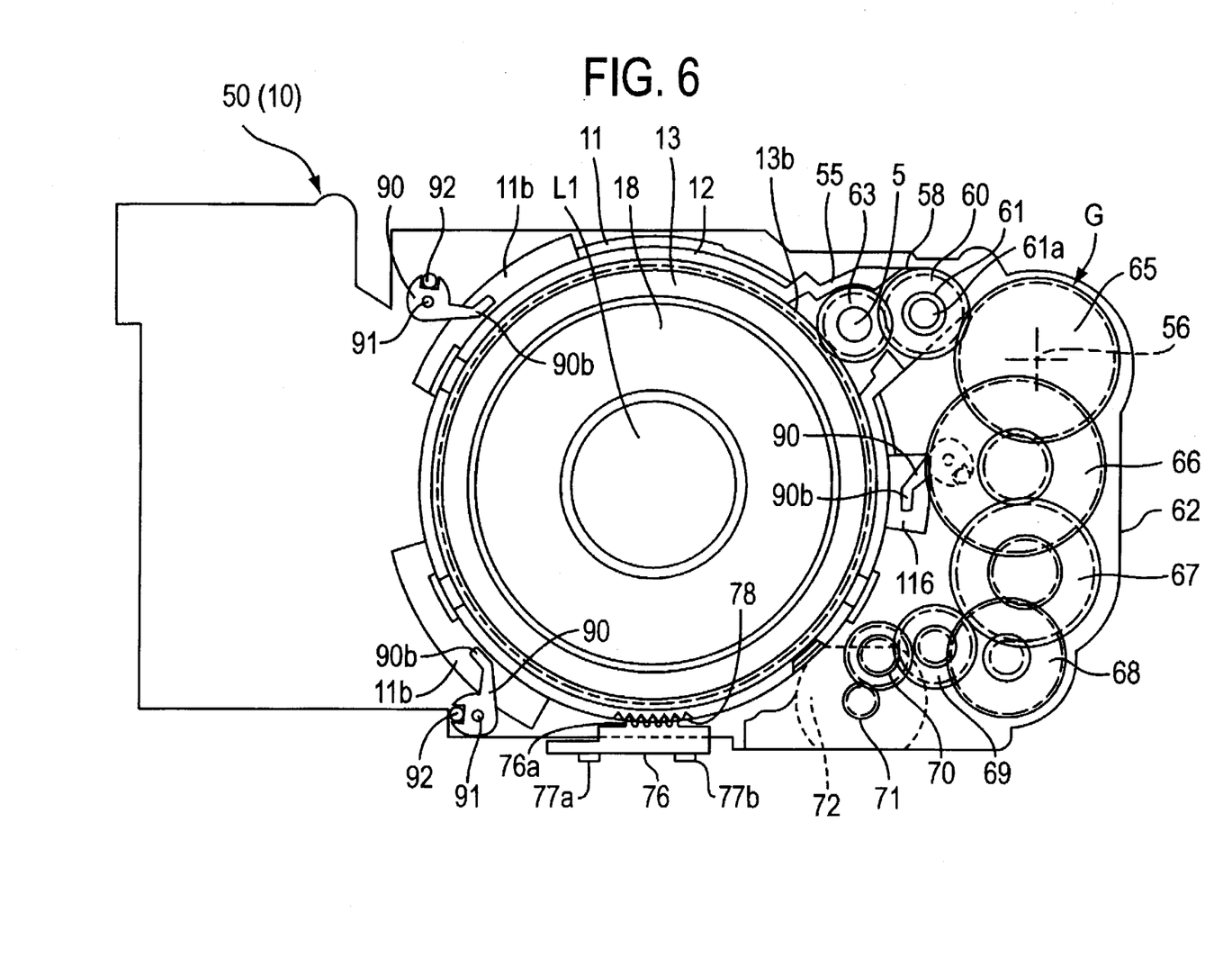
FIG. 6 is a front elevational view of the zoom lens barrel and gear train, illustrating the structure of the assembly relative to the camera body.

When a back focus adjusting operation needs to be carried out, the screw 77b, which is screwed into the stationary block 50, is first loosened to allow the positioning plate 76 to move in a horizontal direction in the state shown in FIG. 6. In this state, if the adjusting ring 11 is rotated in foward or reverse directions, the stationary barrel 12 is moved in the optical axis direction O without rotating, in accordance with the female helicoid gear 11a of the adjusting ring 11 and the male helicoid gear 12c, which are engaged with each other. Consequently, the cam ring 13 is moved forwardly or rearwardly in the optical axis direction O together with the stationary barrel 12, and the position of the first, second and third lens groups L1, L2 and L3, with respect to the stationary block 50 (i.e., the film plane F) in the optical axis direction O, is varied to adjust a back focus.

After the adjustment is completed, the screw 77b is fastened to restrict the movement of the adjusting ring 11 by the gear 76a engaged with the sector gear 78 so that the adjusted back focus will not vary.

Accordingly, in the zoom lens barrel of the above embodiment, since the stationary barrel 12 is only varied in the optical axis direction O (i.e., since the stationary barrel 12 is not rotated), a photographing lens barrel, including the stationary barrel 12, is not deviated from various members formed on the camera body in the circumferential direction of the photographing lens barrel when the stationary barrel is rotated. Therefore, it is not necessary to consider the circumferential position of the various members when forming the same on the camera body.

As can be seen from the foregoing, according to the present invention, since the position of the stationary barrel can be changed in the optical axis direction O, without rotating when a back focus is adjusted, a photographing lens barrel, including the stationary barrel, is not deviated from various members formed on the camera body in a circumferential direction when the stationary barrel is rotated. Therefore, the positions of the various members with respect to the zoom lens barrel do not need to be taken into consideration when forming the same on the camera body.

Furthermore, according to the present invention, since the final gear is required to have only a length which corresponds to the adjustable range of the circumferential gear, i.e., the moving range of the cam ring in the optical axis direction, regardless of the moving amount of the cam ring due to an adjustment of a back focus, it is possible to keep the length of the final gear short. As a result, it is possible to downsize the camera.

Although the invention has been described with reference to particular means, materials and embodiments, it is to be understood that the invention is not limited to the particulars disclosed and extends to all equivalents within the scope of the claims.

We claim:

1. A camera having an apparatus for adjusting a back focus, comprising:
    a rotationally stationary barrel that is fixed to an associated camera body;
    a cam ring that is threadedly engaged with said rotationally stationary barrel on an inner peripheral surface of said rotationally stationary barrel;
    a gear train for rotating said cam ring by transmitting a driving force through a circumferential gear that is provided on an outer peripheral surface of said cam ring, wherein a back focus adjustment is effected by moving said rotationally stationary barrel in an optical axial direction;
    a final gear; and
    a transmitting gear; wherein,
    said final gear and said transmitting gear are components of said gear train, said final gear being engaged with said circumferential gear, and said transmitting gear engaging said final gear, and wherein said final gear and said transmitting gear are supported on said rotationally stationary barrel so that said final gear and said transmitting gear move together with said rotationally stationary barrel in the optical axial direction upon back focus adjustment, the back focus adjustment being effected in accordance with movement of said rotationally stationary barrel in the optical axial direction.

2. The camera of claim 1, further comprising:
    a shaft about which said transmitting gear rotates, said shaft being provided such that said transmitting gear is movable in the optical axis direction with respect to said shaft, wherein said shaft is supported on said camera body.

3. The camera of claim 1, further comprising:
    an adjusting ring that is rotated to move said rotationally stationary barrel in the optical axis direction thereby effecting a back focus adjustment.

4. The camera of claim 1, further comprising:
    a stationary block which is provided as a part of said camera body, wherein said stationary block is integral with said shaft.

5. The camera of claim 1, wherein said circumferential gear is provided parallel to a thread formed onto said cam ring, and wherein said final gear has sufficient axial length so as to maintain engagement between said final gear and said circumferential gear over an entire range of axial movement of said cam ring.

6. The camera of claim 5, further comprising:
    a shaft restricting portion which is provided on said rotationally stationary barrel, wherein said shaft restricting portion is composed of a pair of brackets having a pair of supporting holes through which said shaft passes.

7. A camera having an apparatus for adjusting a back focus, comprising:
    a rotationally stationary barrel to be secured to a camera body, said rotationally stationary barrel including movable lens groups comprising a photographing lens and including a threaded portion;
    restricting means for preventing rotational movement of said rotationally stationary barrel and for permitting axial movement of said rotationally stationary barrel; and an adjusting ring provided in said camera body and including a threaded portion directly threadedly engaging with said threaded portion of said rotationally stationary barrel, direct engagement of said threaded portion of said rotationally stationary barrel and said threaded portion of said adjusting ring comprising means for adjusting a position of said rotationally stationary barrel in an optical axial direction in accordance with rotation of said adjusting ring.

8. The camera of claim 7, wherein said restricting means comprises an engaging projection that is provided on an outer peripheral surface of said rotationally stationary barrel, and an engaging groove that is provided on said camera body, said engaging projection engaging said engaging groove.

9. The camera according to claim 7, further comprising means for preventing movement of said adjusting ring in the optical axis direction.

10. A camera according to claim 7, further comprising means for selectively preventing rotation of said adjusting ring.

11. The camera having an apparatus for adjusting a back focus according to claim 7, said restricting means comprising at least one element extending axially along an outer surface of said rotationally stationary barrel.

12. The camera having an apparatus for adjusting a back focus according to claim 7, said threaded portion of said rotationally stationary barrel comprising a male helicoid.

13. The camera having an apparatus for adjusting a back focus according to claim 7, said threaded portion of said adjusting ring comprising a female helicoid.

14. The camera having an apparatus for adjusting a back focus according to claim 7, said adjusting ring being mounted to preclude axial movement of said adjusting ring.

15. The camera having an apparatus for adjusting a back focus according to claim 7, said adjustment means comprising a back focus adjustment mechanism of the camera.

16. The camera of claim 7, said position adjusting means comprising means for moving said rotationally stationary barrel in an optical axis direction for adjusting a back focus.

17. The camera of claim 16 wherein said threaded portion of said stationary barrel comprises a male thread provided on an outer peripheral surface of said rotationally stationary barrel, said threaded portion of adjusting ring comprising a female thread for engaging said male thread, and movement of said adjusting ring with respect to said camera body being restricted in the optical axis direction.

18. The camera of claim 17, further comprising:

relative rotational movement restricting means for restricting rotational movement of said adjusting ring with respect to said camera body.

19. The camera of claim 18, wherein said relative rotational movement restricting means includes a positioning gear which is provided on said adjusting ring, and a positioning member which is provided on said camera body at a position corresponding to a position of said positioning gear.

20. The camera of claim 19, where said positioning member includes an engaging gear which engages said positioning gear provided on said adjusting ring.

21. The camera of claim 20, wherein said positioning member is attached to said camera body by a screw, said positioning member being movable with respect to said camera body when said screw is loosened and immovable with respect to said camera body when said screw is fastened.

22. A camera having an apparatus for adjusting a back focus, comprising:

a rotationally stationary barrel to be secured to a camera body, said rotationally stationary barrel including movable lens groups comprising a photographing lens;

means for preventing rotational movement of said rotationally stationary barrel with respect to the camera body;

adjusting means, engaged with said rotationally stationary barrel, for transmitting movement to said rotationally stationary barrel;

means mounting said adjusting means to prevent axial movement of said adjusting means and to permit rotational movement of said adjusting means;

means for selectively preventing and permitting rotational motion of said adjusting means; and means for coupling said adjusting means and said rotationally stationary barrel to move said rotationally stationary barrel along an optical axial direction in association with rotational movement of said adjusting means to thereby adjust a back focus of the photographing lens.

23. The camera according to claim 22, said adjusting means comprising an adjusting ring providing with a first threaded surface portion, said rotationally stationary barrel including a second threaded surface portion engaged with said first threaded surface portion of said adjusting ring, said first and second threaded surface portions comprising means for transforming a rotational motion of said adjusting ring into an axial motion of said rotationally stationary barrel.

24. The camera according to claim 22, said coupling means comprising mating threaded sections on said adjusting means and on the stationary barrel.

25. A camera having a back focus adjusting apparatus, comprising:

a rotationally stationary barrel to be secured to a camera body;

a cam ring threadedly engaged with said rotationally stationary barrel on an inner peripheral surface of said rotationally stationary barrel and;

a gear train for rotating said cam ring by transmitting a driving force to a circumferential gear positioned on an outer peripheral surface of said cam ring, said gear train including a final gear engaged with said circumferential gear of said cam ring, said final gear being supported on said rotationally stationary barrel so as to move together with said rotationally stationary barrel in an optical axial direction during a back focus adjustment operation, said back focus adjustment operation defined by movement of said rotationally stationary barrel in the optical axial direction.

26. The camera according to claim 25, further comprising an intermediate gear in said gear train, a shaft about which said intermediate gear rotates secured to the camera body, said intermediate gear being movable in the optical axis direction along said shaft.

27. The camera according to claim 25, said circumferential gear positioned parallel to a thread formed on said cam ring, said final gear having an axial length sufficient to maintain engagement between said final gear and said circumferential gear over an entire range of axial movement of said cam ring.

28. A camera having an apparatus for adjusting a back focus, comprising:

a rotationally stationary barrel to be secured to a camera body, said rotationally stationary barrel including moveable lens groups comprising a photographing lens;

guide means for guiding said rotationally stationary barrel for movement in an optical axial direction while restricting rotational movement of said rotationally stationary barrel with respect to said camera body;

an adjusting ring provided in said camera body and being threadedly engaged with an outer periphery of said rotationally stationary barrel, said adjusting ring being rotatable with respect to the optical axial direction but being restricted from movement in the optical axial direction; and adjusting means for adjusting a position of said rotationally stationary barrel in the optical axial direction in association with rotation of said adjusting ring with respect to said camera body.

29. A camera according to claim 28, further comprising means for selectively locking said adjusting ring to prevent rotation of said adjusting ring.

30. A camera having an apparatus for adjusting a back focus, comprising:

a rotationally stationary barrel to be secured to a camera body, said rotationally stationary barrel including movable lens groups comprising a photographing lens and including a threaded portion;

a restricting mechanism that prevents rotational movement of said rotationally stationary barrel and permits axial movement of said rotationally stationary barrel; and an adjusting ring provided in said camera body and including a threaded portion directly threadedly engaging with said threaded portion of said rotationally stationary barrel, direct engagement of said threaded portion of said rotationally stationary barrel and said threaded portion of said adjusting ring comprising a mechanism that adjusts a back focus by adjusting a position of said rotationally stationary barrel in an optical axial direction in accordance with rotation of said adjusting ring.

31. A camera having an apparatus for adjusting a back focus, comprising:

a rotationally stationary barrel to be secured to a camera body, said rotationally stationary barrel including movable lens groups comprising a photographing lens;

a mechanism that prevents rotational movement of said rotationally stationary barrel with respect to the camera body;

an adjuster that is engaged with said rotationally stationary barrel and that transmits movement to said rotationally stationary barrel;

a structure mounting said adjuster to prevent axial movement of said adjuster and to permit rotational movement of said adjuster;

a mechanism that selectively prevents and permits rotational motion of said adjuster; and a coupler that couples said adjuster and said rotationally stationary barrel to move said rotationally stationary barrel along an optical axial direction in association with rotational movement of said adjuster to thereby adjust a back focus of the photographing lens.

32. A camera having an apparatus for adjusting a back focus, comprising:

a rotationally stationary barrel to be secured to a camera body, said rotationally stationary barrel including moveable lens groups comprising a photographing lens;

a guide structure that guides said rotationally stationary barrel for movement in an optical axial direction while restricting rotational movement of said rotationally stationary barrel with respect to said camera body;

an adjusting ring provided in said camera body and being threadedly engaged with an outer periphery of said rotationally stationary barrel, said adjusting ring being rotatable with respect to the optical axial direction but being restricted from movement in the optical axial direction; and an adjuster that adjusts a position of said rotationally stationary barrel in the optical axial direction in association with rotation of said adjusting ring with respect to said camera body.

* * * * *